United States Patent
Tseng

(10) Patent No.: US 8,165,624 B2
(45) Date of Patent: Apr. 24, 2012

(54) CASE FOR AN ELECTRONIC DEVICE WITH A WIRELESS COMMUNICATION FUNCTION AND METHOD FOR FORMING THE SAME

(75) Inventor: Chieh-Fu Tseng, Kaohsiung (TW)

(73) Assignee: Advanced International Multitech Co., Ltd., Kaohsiung (TW)

( * ) Notice: Subject to any disclaimer, the term of this patent is extended or adjusted under 35 U.S.C. 154(b) by 13 days.

(21) Appl. No.: 12/927,384

(22) Filed: Nov. 12, 2010

(65) Prior Publication Data

US 2011/0117872 A1 May 19, 2011

(30) Foreign Application Priority Data

Nov. 13, 2009 (TW) ................................ 98138635 A

(51) Int. Cl.
*H04M 1/00* (2006.01)
(52) U.S. Cl. .................... 455/550.1; 455/90.3; 455/347; 379/433.01; 343/702
(58) Field of Classification Search .................. 455/90.3, 455/347, 550.1, 575.1, 575.8; 379/428.01, 379/433.01, 437; 343/702, 718
See application file for complete search history.

(56) References Cited

U.S. PATENT DOCUMENTS

| | | | | |
|---|---|---|---|---|
| 6,489,930 B2* | 12/2002 | Teshirogi et al. | ............. | 343/785 |
| 6,518,932 B1* | 2/2003 | Matsui et al. | ................. | 343/770 |
| 6,832,081 B1* | 12/2004 | Hiramatsu et al. | ............ | 455/328 |
| 6,947,764 B2* | 9/2005 | Carillo et al. | ............. | 455/550.1 |
| 7,728,780 B2* | 6/2010 | Ishida | ........................... | 343/702 |

\* cited by examiner

*Primary Examiner* — Nhan Le
(74) *Attorney, Agent, or Firm* — DLA Piper LLP (US)

(57) ABSTRACT

A method for forming a case of an electronic device with a wireless communication function includes: (a) providing a pair of outer prepreg layers, each containing a fiber that permits permeation of an electromagnetic wave; (b) providing a plurality of inner prepreg layers, each of which includes: a first prepreg sheet that contains a first fiber, which permits permeation of an electromagnetic wave; and a second prepreg sheet containing a second fiber that prevents permeation of an electromagnetic wave and that has a strength higher than that of the first fiber; (c) stacking and pressing the inner prepreg layers to obtain an inner laminate; (d) disposing the inner laminate between the outer prepreg layers; and (e) forming the outer prepreg layers and the inner laminate in a mold. A case for an electronic device with a wireless communication function is also disclosed.

12 Claims, 5 Drawing Sheets

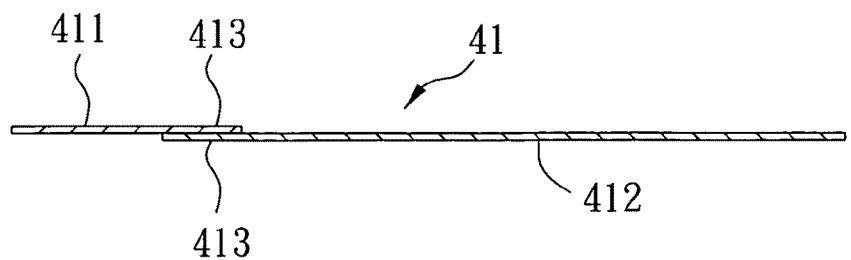
FIG. 5
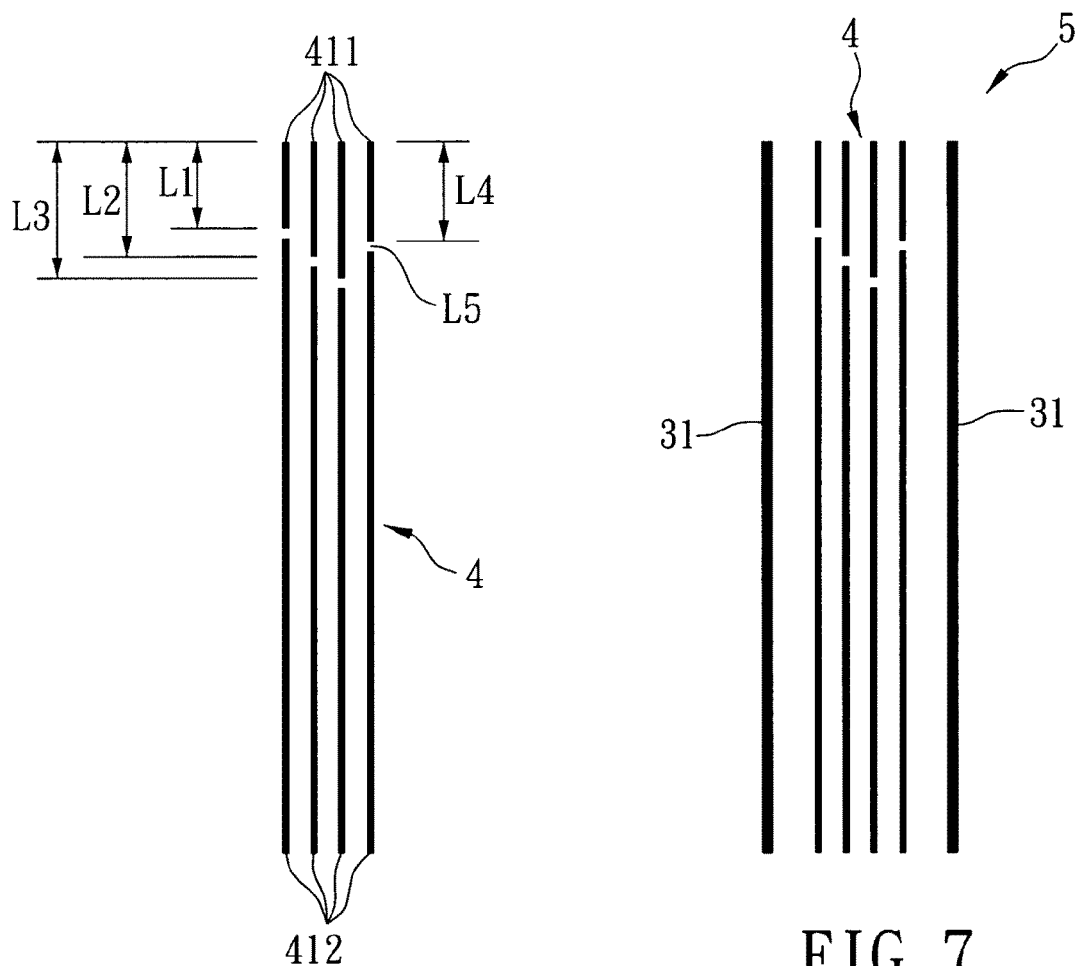
FIG. 6
FIG. 7

CASE FOR AN ELECTRONIC DEVICE WITH A WIRELESS COMMUNICATION FUNCTION AND METHOD FOR FORMING THE SAME

CROSS-REFERENCE TO RELATED APPLICATION

This application claims priority of Taiwanese application no. 098138635, filed on Nov. 13, 2009.

BACKGROUND OF THE INVENTION

1. Field of the Invention

This invention relates to a case for an electronic device and a method for forming the case.

2. Description of the Related Art

Taiwanese patent publication no. 529326 discloses a process for producing cases of notebook computers, mobile phones or personal digital assistants (PDAs). The process is intended to produce integrally formed cases and includes stacking a plurality of prepreg layers, followed by forming the prepreg layers into one piece using heat pressing. Each of the prepreg layers is made from carbon fiber fabric, glass fiber fabric, or Kevlar fiber fabric.

Although the carbon fiber fabric has properties of lightweight, high-strength and good electromagnetic wave shielding, it also blocks the permeation of radio waves. However, with the development of radio communication and wireless fidelity (Wi-Fi) communication in notebook computers, wireless data transmission would be limited if a case of a notebook computer is made entirely using carbon fiber. On the other hand, if the case of the notebook computer is made entirely using glass fiber, although the wireless transmission would not be blocked, the case would have a relatively low strength since the glass fiber has a lower rigidity compared to the carbon fiber.

Referring to FIG. 1, in order to solve the above problem, the conventional case 1 of the notebook computer generally includes two portions. One portion is a non-antenna region 11 and another portion includes three antenna regions 12. The non-antenna region 11 is made of carbon fiber and each of the antenna regions 12 is made of a plastic material or glass fiber. The non-antenna region 11 is made by heat pressing a plurality of carbon fiber prepreg layers, followed by forming three notches 12'. The antenna regions 12 are respectively secured to the non-antenna region 11 using an adhesive or screws and cover the notches 12'. However, the non-antenna region 11 and the antenna regions 12 are separately made using different molds. Accordingly, the process for forming the conventional case 1 of the notebook computer is conducted at a relatively high cost. Furthermore, the conventional case 1 has bonding lines that are formed among the non-antenna region 11 and the antenna regions 12 and that are detrimental to the appearance of the case 1.

SUMMARY OF THE INVENTION

Therefore, an object of the present invention is to provide a case for an electronic device with a wireless communication function and a method for forming the case that can overcome the aforesaid drawbacks associated with the prior art.

According to one aspect of this invention, there is provided a method for forming a case of an electronic device, the case having an antenna region and a non-antenna region with a wireless communication function, the method comprising:

(a) providing a pair of outer prepreg layers adapted to form the antenna region and the non-antenna region, each of the outer prepreg layers containing a fiber that permits permeation of an electromagnetic wave;

(b) providing a plurality of inner prepreg layers, each of which includes: a first prepreg sheet that is adapted to form the antenna region and that contains a first fiber, which permits permeation of an electromagnetic wave; and a second prepreg sheet that is connected to the first prepreg sheet and that is adapted to form the non-antenna region, the second prepreg sheet containing a second fiber that prevents permeation of an electromagnetic wave and that has a strength higher than that of the first fiber;

(c) stacking and pressing the inner prepreg layers to obtain an inner laminate;

(d) disposing the inner laminate between the outer prepreg layers; and (e) forming the outer prepreg layers and the inner laminate in a mold.

According to another aspect of this invention, there is provided a case for an electronic device with a wireless communication function, the case having an antenna region and a non-antenna region and comprising:

a pair of outer prepreg layers adapted to form the antenna region and the non-antenna region, each of the outer prepreg layers containing a fiber that permits permeation of an electromagnetic wave; and an inner laminate disposed between the outer prepreg layers and including a plurality of inner prepreg layers, each of the inner prepreg layers including: a first prepreg sheet that is adapted to form the antenna region and that contains a first fiber, which permits permeation of an electromagnetic wave; and a second prepreg sheet that is adapted to form the non-antenna region, the second prepreg sheet containing a second fiber that prevents permeation of an electromagnetic wave and that has a strength higher than that of the first fiber.

BRIEF DESCRIPTION OF THE DRAWINGS

Other features and advantages of the present invention will become apparent in the following detailed description of the preferred embodiment of the invention, with reference to the accompanying drawings, in which:

FIG. 5 is a cross-sectional view taken from line V-V shown in FIG. 4 to illustrate a first prepreg sheet overlapped with a second prepreg sheet in each of the inner prepreg layers;

FIG. 6 is a schematic view illustrating how overlapping portions of the first and second prepreg sheets of the inner prepreg layers shown in FIG. 5 are staggered relative to each other;

FIG. 7 is a schematic view illustrating how the inner laminate is disposed between the outer prepreg layers;

DETAILED DESCRIPTION OF THE PREFERRED EMBODIMENT

Figure 1:
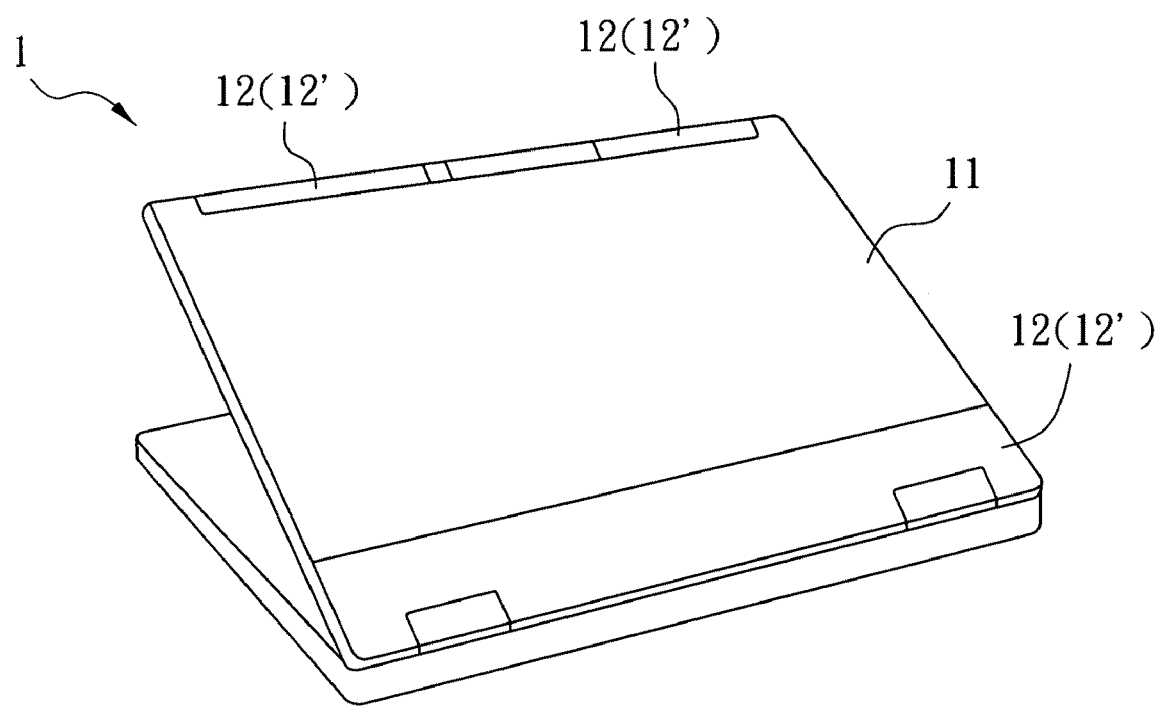
FIG. 1 is a perspective view illustrating a conventional notebook computer case.
Figure 2:
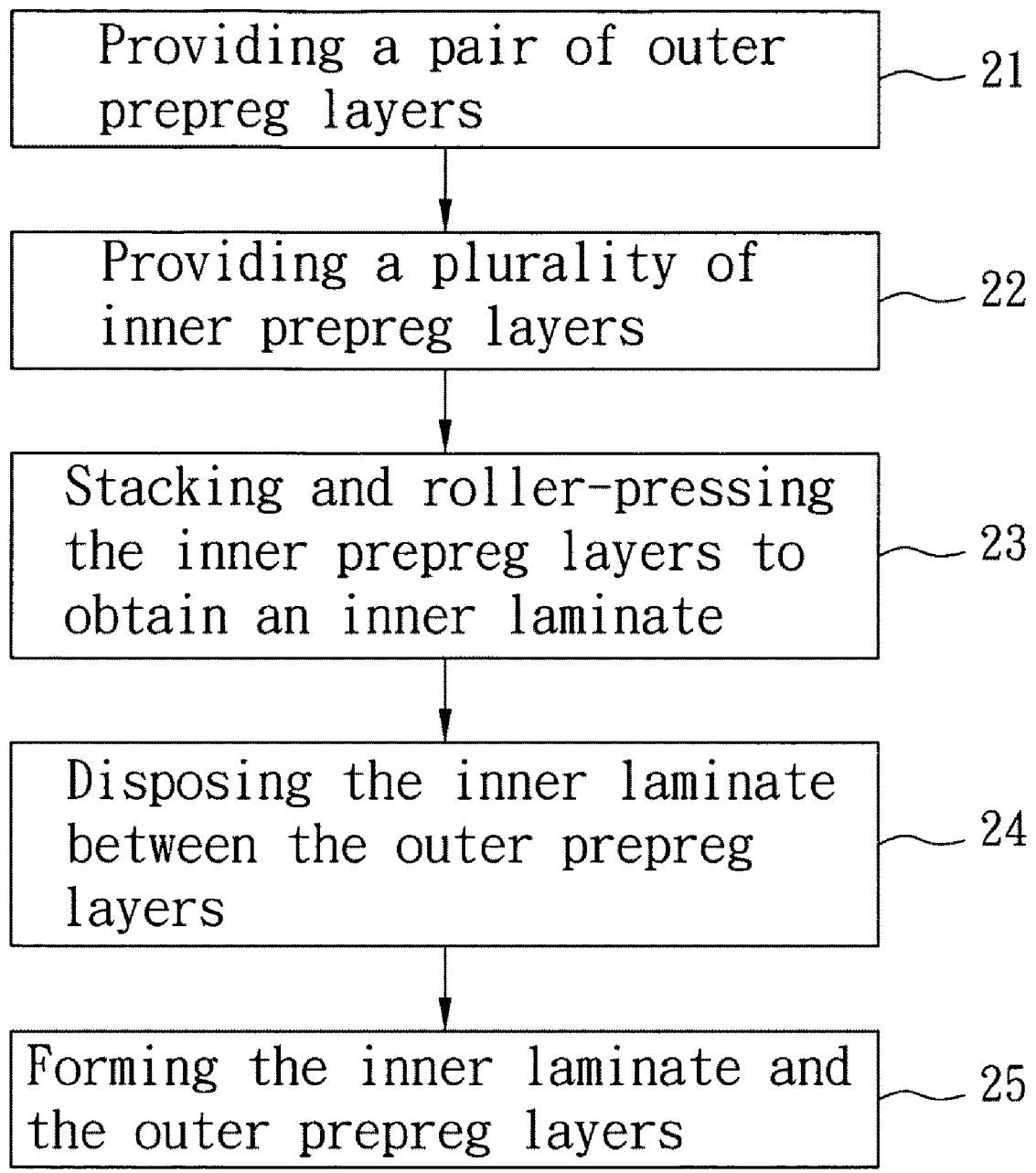
FIG. 2 is a flow chart illustrating consecutive steps of the preferred embodiment of the method for forming a notebook computer case according to the present invention.
Figure 9:
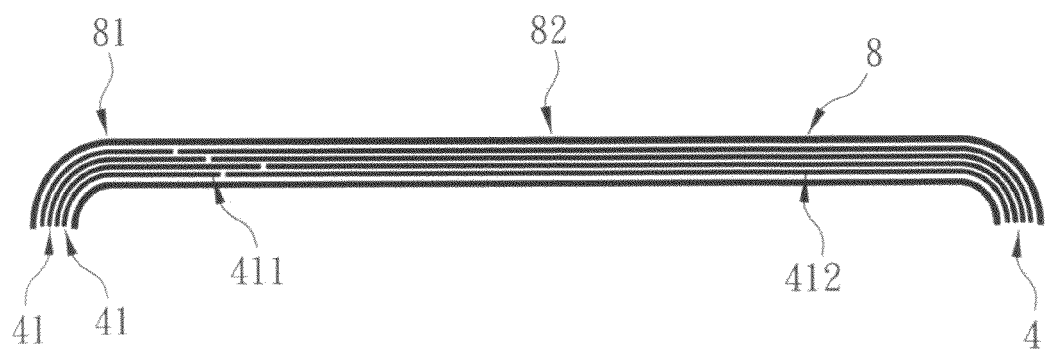
FIG. 9 is a schematic view illustrating the case obtained after curing.

Referring to FIGS. 2 and 9, the preferred embodiment of a method for forming a case 8 of an electronic device with a wireless communication function according to the present invention is shown. The case 8 has an antenna region 81 and a non-antenna region 82. Preferably, the case 8 is a notebook computer case.

Figure 3:
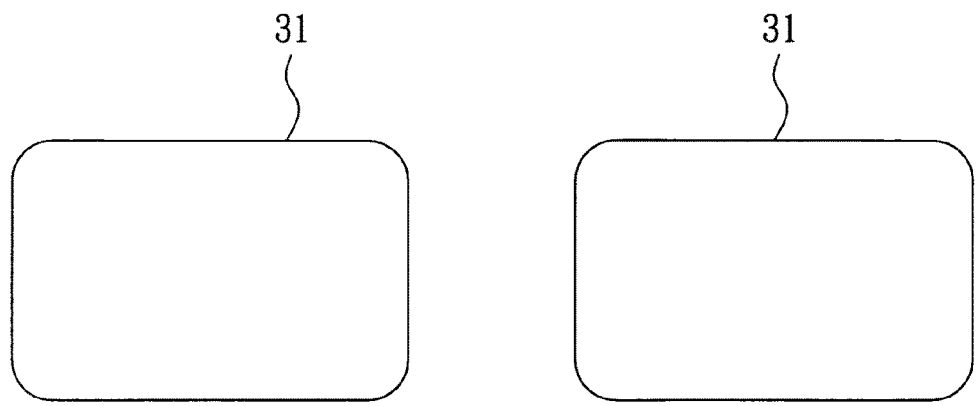
FIG. 3 is a schematic view illustrating a pair of outer prepreg layers formed according to the preferred embodiment of FIG. 2.

In step 21, a pair of outer prepreg layers 31 are cut from a prepreg fabric so that each of the outer prepreg layers 31 has a size sufficient to form the case 8 (see FIG. 3). The outer prepreg layers 31 are adapted to form the antenna region 81 and the non-antenna region 82. Each of the outer prepreg layers 31 contains a fiber that permits permeation of an electromagnetic wave (a radio wave). In the preferred embodiment, the fiber contained in the outer prepreg layers 31 may be selected from glass fiber, basalt fiber and Kevlar fiber based on the actual requirement of the case 8 of the electronic device.

Figure 4:
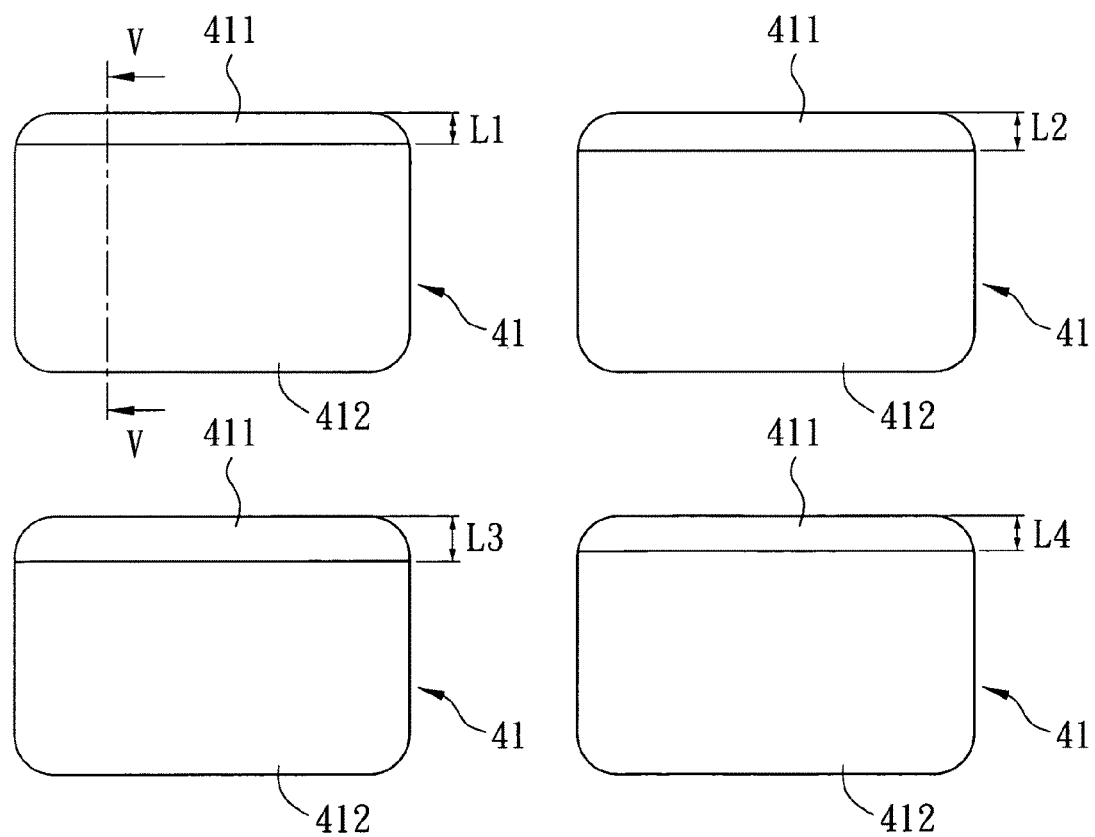
FIG. 4 is a schematic view illustrating four inner prepreg layers of an inner laminate formed according to the preferred embodiment of FIG. 2.

In step 22, a plurality of inner prepreg layers 41 are provided (see FIG. 4). Each of the inner prepreg layers 41 includes a first prepreg sheet 411 and a second prepreg sheet 412. The first prepreg sheet 411 of each of the inner layers 41 may be cut from a first fabric layer, is adapted to form the antenna region 81, and contains a first fiber. The second prepreg sheet 412 of each of the inner prepreg layers 41 may be cut from a second fabric layer, is adapted to form the non-antenna region 82, and contains a second fiber. After the first and second prepreg sheets 411, 412 of each of the inner prepreg layers 41 are respectively cut from the first and second fabric layers, the first prepreg sheet 411 is seamlessly connected to the second prepreg sheet 412 so that each of the inner prepreg layers 41 has a size corresponding to the size of each of the outer prepreg layers 31.

In this preferred embodiment, four pieces of the inner prepreg layers 41 are provided. However, the number of the inner prepreg layers 41 may range from 2 to 12 based on the actual requirement of the case 8 of the electronic device.

In the preferred embodiment, the first fiber can permit permeation of an electromagnetic wave (a radio wave) and may be glass fiber, basalt fiber, or Kevlar fiber. The second fiber prevents permeation of an electromagnetic wave (a radio wave), has a strength higher than that of the first fiber so as to enhance the strength of the case 8, and may be carbon fiber.

In the preferred embodiment, the seamless connection of the first and second prepreg sheets 411, 412 is accomplished by overlapping the first prepreg sheet 411 with the second prepreg sheet 412 in each of the inner prepreg layer 41 (see FIG. 5). The overlapping portions 413 of the first and second prepreg sheets 411, 412 become seamless when they are formed under pressure and heat in subsequent steps.

Referring to FIGS. 4 and 6, the widths of the first prepreg sheets 411 of the four pieces of the inner prepreg layers 41 are different from each other and are denoted by L1, L2, L3 and L4, respectively. The width differences among the first prepreg sheets 411 (i.e., |L1−L2|, |L1−L3|, or |L1−L4|) range from 3 mm to 30 mm. Furthermore, an area of each of the first prepreg sheets 411 is less than 30% of an area of a corresponding one of the inner prepreg layers 41.

In step 23, the inner prepreg layers 41 are stacked by aligning corresponding corners of the inner prepreg layers 41, and are roller-pressed to obtain an inner laminate 4 (see FIG. 6). Because the widths of the first prepreg sheets 411 in the four inner prepreg layers 41 are different from each other as mentioned hereinabove, locations (L5) of the overlapping portions 413 of the first and second prepreg sheets 411, 412 of the inner prepreg layers 41 are staggered relative to each other by a distance ranging from 3 mm to 30 mm, as shown in FIGS. 5 and 6. In FIG. 6, a gap shown between the first and second prepreg sheets 411, 412 in each of the inner prepreg layers 41 is used to explain the locations (L5) of the overlapping portions 413 of the first and second prepreg sheets 411, 412 in an exploded way. It is noted that no such gap is present in the case product obtained according to the method of the present invention.

In step 24, the inner laminate 4 is disposed between the outer prepreg layers 31, and the corners of the inner laminate 4 and the outer prepreg layers 31 are aligned.

Figure 8:
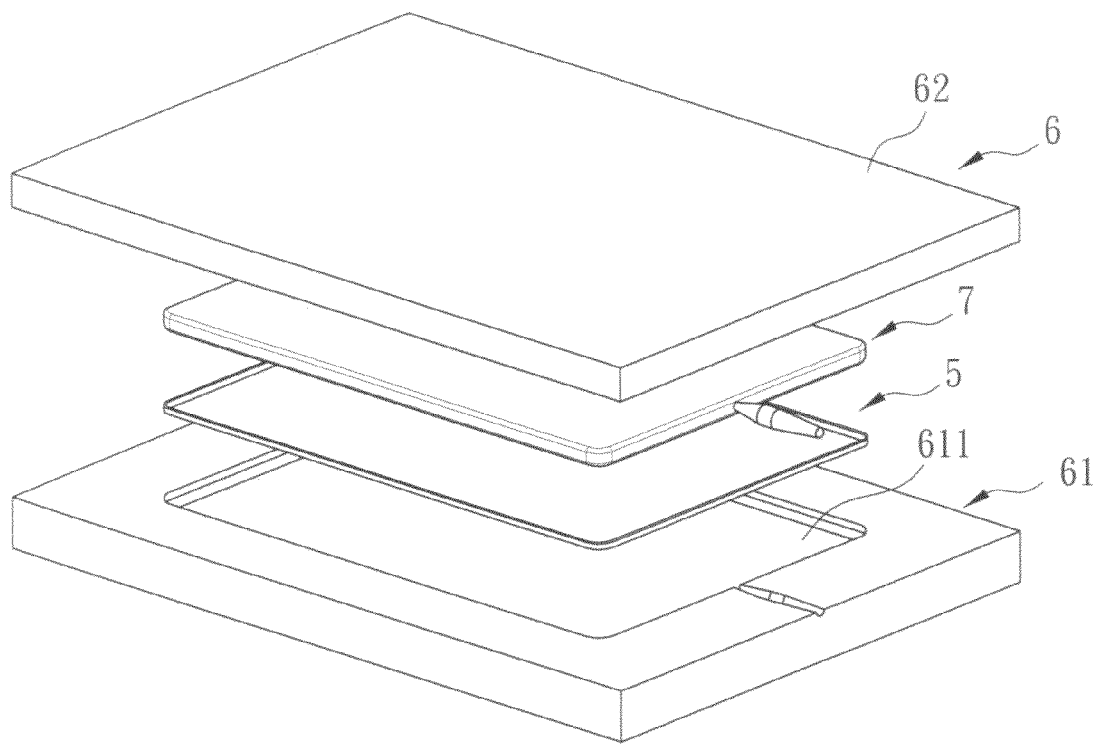
FIG. 8 is a schematic view illustrating how the outer prepreg layers and the inner laminate are formed in a mold.

In step 25, the inner laminate 4 and the outer prepreg layers 31 are formed by roller-pressing to obtain a stack 5 shown in FIG. 7, followed by heat-pressing the stack 5 in a mold 6 to obtain the case 8 (see FIGS. 8 and 9).

In detail, the mold 6 includes lower and upper mold units 61, 62. The heat-pressing is conducted by disposing the stack 5 in a cavity 611 of the lower mold unit 61, disposing an airbag 7 above the stack 5, and disposing the upper mold unit 62 above the lower mold unit 61 so that the stack 5 and the airbag 7 are clamped between the upper and lower mold units 62, 61. After the airbag 7 is inflated and after heat is applied to the mold 6, the stack 5 is formed into the case 8.

Preferably, a total weight of the outer prepreg layers 31 is less than 40% of a weight of the case 8 of the electronic device. In the preferred embodiment, the airbag 7 is made of nylon. However, the airbag 7 may also be made of latex or silicone rubber.

The case 8 shown in FIG. 9 is formed according to the method of this invention. An antenna (not shown) is disposed to correspond to the antenna region 81 of the case 8 and has a size smaller than the area of the antenna region 81. The fiber contained in the outer prepreg layers 31 and the first fiber of the first prepreg sheets 411 permit permeation of an electromagnetic wave (a radio wave). The second fiber of the second prepreg sheets 412 has relatively high strength and rigidity. Therefore, the electromagnetic wave (the radio wave) can be received by the antenna and can be emitted from the antenna through the antenna region 81 of the case 8, and the strength of the case 8 can be enhanced by the second fiber contained in the second prepreg sheets 412 of the inner laminate 4.

It should be noted that the case 8 may include a monitor cover of a notebook computer, and may be formed with a keyboard base of the notebook computer based on a design of the notebook computer.

The case 8 of the electronic device and the method for forming the same have the following advantages:

1. The antenna region 81 and the non-antenna region 82 of the case 8 of this invention are not required to be separately formed using different molds unlike the method disclosed in the prior art, but are integrally formed in the mold 6. Therefore, the case 8 formed according to the method of this invention is cost-saving.

2. The electromagnetic wave (radio wave) will not be blocked by fiber contained in the outer prepreg layers 31 and the first fiber of the first prepreg sheets 411 in the antenna region 81 of the case 8, and the strength of the case 8 can be enhanced by the second fiber of the second prepreg layers 412 in the non-antenna region 82.

3. Since the first prepreg sheets 411 (that are adapted to form the antenna region 81) are respectively and seamlessly connected to the second prepreg sheets 412 (that are adapted to form the non-antenna region 82) between the outer prepreg layers 31, no bonding lines are formed on the outer surface of the case 8. That is, the case 8 of this invention has a relatively smooth outer surface and the unappealing appearance of the conventional case 1 attributed to the bonding lines can be improved.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A method for forming a case of an electronic device with a wireless communication function, the case having an antenna region and a non-antenna region, the method comprising:
   (a) providing a pair of outer prepreg layers adapted to form the antenna region and the non-antenna region, each of the outer prepreg layers containing a fiber that permits permeation of an electromagnetic wave;
   (b) providing a plurality of inner prepreg layers, each of which includes: a first prepreg sheet that is adapted to form the antenna region and that contains a first fiber, which permits permeation of an electromagnetic wave; and a second prepreg sheet that is connected to the first prepreg sheet and that is adapted to form the non-antenna region, the second prepreg sheet containing a second fiber that prevents permeation of an electromagnetic wave and that has a strength higher than that of the first fiber;
   (c) stacking and pressing the inner prepreg layers to obtain an inner laminate;
   (d) disposing the inner laminate between the outer prepreg layers; and
   (e) forming the outer prepreg layers and the inner laminate in a mold.

2. The method of claim 1, wherein the fiber contained in the outer prepreg layers and the first fiber are selected from the group consisting of glass fiber, basalt fiber, and Kevlar fiber.

3. The method of claim 1, wherein the second fiber includes carbon fiber.

4. The method of claim 1, wherein, in step (b), the first prepreg sheet is connected to the second prepreg sheet by overlapping the first prepreg sheet with the second prepreg sheet in each of the inner prepreg layers, and wherein, when the inner prepreg layers are stacked in step (c), locations of the overlapping portions of the first and second prepreg sheets of the inner prepreg layers are staggered relative to each other.

5. The method of claim 4, wherein the locations of the overlapping portions of the first and second prepreg sheets of the inner prepreg layers are staggered relative to each other by a distance ranging from 3 mm to 30 mm.

6. A case for an electronic device with a wireless communication function, the case having an antenna region and a non-antenna region and comprising:
   a pair of outer prepreg layers adapted to form said antenna region and said non-antenna region, each of said outer prepreg layers containing a fiber that permits permeation of an electromagnetic wave; and
   an inner laminate disposed between said outer prepreg layers and including a plurality of inner prepreg layers, each of said inner prepreg layers including: a first prepreg sheet that is adapted to form said antenna region and that contains a first fiber, which permits permeation of an electromagnetic wave; and a second prepreg sheet that is adapted to form said non-antenna region, said second prepreg sheet containing a second fiber that prevents permeation of an electromagnetic wave and that has a strength higher than that of said first fiber.

7. The case of claim 6, wherein said fiber contained in said outer prepreg layers and said first fiber are selected from the group consisting of glass fiber, basalt fiber, and Kevlar fiber.

8. The case of claim 7, wherein said second fiber includes carbon fiber.

9. The case of claim 6, wherein said first prepreg sheet is overlapped with said second prepreg sheet in each of said inner prepreg layers, and wherein locations of the overlapping portions of said first and second prepreg sheets of said inner prepreg layers are staggered relative to each other.

10. The case of claim 9, wherein the locations of said overlapping portions of said first and second prepreg sheets of said inner prepreg layers are staggered relative to each other by a distance ranging from 3 mm to 30 mm.

11. The case of claim 6, wherein an area of each of said first prepreg sheets is less than 30% of an area of a corresponding one of said inner prepreg layers.

12. The case of claim 6, wherein a total weight of said outer prepreg layers is less than 40% of a weight of said case.

* * * * *